US012225466B2

(12) United States Patent
Yang et al.

(10) Patent No.: US 12,225,466 B2
(45) Date of Patent: Feb. 11, 2025

(54) SCHEDULING METHOD, ACCESS POINT, AND STATION

(71) Applicant: HUAWEI TECHNOLOGIES CO., LTD., Guangdong (CN)

(72) Inventors: Mao Yang, Xi'an (CN); Bo Li, Xi'an (CN); Yanchun Li, Boulogne Billancourt (FR)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 337 days.

(21) Appl. No.: 17/750,127

(22) Filed: May 20, 2022

(65) Prior Publication Data

US 2022/0353813 A1 Nov. 3, 2022

Related U.S. Application Data

(63) Continuation of application No. 16/247,857, filed on Jan. 15, 2019, now Pat. No. 11,375,454, which is a
(Continued)

(30) Foreign Application Priority Data

Jul. 19, 2016 (CN) .......................... 201610575570.2

(51) Int. Cl.
*H04W 52/02* (2009.01)
*H04W 72/12* (2023.01)
(Continued)

(52) U.S. Cl.
CPC ....... *H04W 52/0229* (2013.01); *H04W 72/12* (2013.01); *H04W 72/23* (2023.01);
(Continued)

(58) Field of Classification Search
CPC .. H04W 52/0229; H04W 72/23; H04W 72/12
(Continued)

(56) References Cited

U.S. PATENT DOCUMENTS

2007/0206517 A1  9/2007  Kakani
2011/0064013 A1*  3/2011  Liu ......................... H04W 4/06
370/312
(Continued)

FOREIGN PATENT DOCUMENTS

CN  103051410 A  4/2013
CN  103563457 A  2/2014
(Continued)

*Primary Examiner* — Christopher M Crutchfield
*Assistant Examiner* — Jean F Voltaire
(74) *Attorney, Agent, or Firm* — WOMBLE BOND DICKINSON (US) LLP

(57) ABSTRACT

This application discloses a scheduling method, an access point, and a station. The method includes: generating, by an access point AP, a first frame, where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station STA corresponding to the first trigger frame; and broadcasting, by the AP, the first frame to at least one STA. Therefore, by using the method provided in the present invention, dynamic network changes can be supported through unified scheduling of the AP, and this is favorable to coordination between the AP and the STA, thereby better reducing power consumption of the STA.

20 Claims, 15 Drawing Sheets

Related U.S. Application Data continuation of application No. PCT/CN2017/089583, filed on Jun. 22, 2017.

(51) Int. Cl.
  *H04W 72/23* (2023.01)
  *H04W 48/10* (2009.01)
  *H04W 74/00* (2009.01)
  *H04W 84/12* (2009.01)

(52) U.S. Cl.
  CPC .......... *H04W 48/10* (2013.01); *H04W 74/006* (2013.01); *H04W 84/12* (2013.01); *Y02D 30/70* (2020.08)

(58) Field of Classification Search
  USPC ........................................... 370/311
  See application file for complete search history.

(56) References Cited

U.S. PATENT DOCUMENTS

| | | | |
|---|---|---|---|
| 2014/0086131 | A1 | 3/2014 | Seok |
| 2015/0063327 | A1* | 3/2015 | Barriac .............. H04W 72/23 370/337 |
| 2015/0156791 | A1 | 6/2015 | Wu et al. |
| 2016/0037484 | A1* | 2/2016 | Kwon .............. H04W 74/004 370/312 |
| 2017/0280388 | A1* | 9/2017 | Asterjadhi ........ H04W 52/0229 |

FOREIGN PATENT DOCUMENTS

| | | |
|---|---|---|
| CN | 103634925 A | 3/2014 |
| CN | 103781153 A | 5/2014 |
| CN | 103874140 A | 6/2014 |
| CN | 103906142 A | 7/2014 |
| CN | 103916964 A | 7/2014 |
| CN | 105517118 A | 4/2016 |

* cited by examiner

SCHEDULING METHOD, ACCESS POINT, AND STATION

CROSS-REFERENCE TO RELATED APPLICATIONS

This application is a continuation of U.S. patent application Ser. No. 16/247,857, filed on Jan. 15, 2019, which is a continuation of International Application No. PCT/CN2017/089583, filed on Jan. 22, 2017. The International Application claims priority to Chinese Patent Application No. 201610575570.2, filed on Jul. 19, 2016. All of the aforementioned patent applications are hereby incorporated by reference in their entireties.

STATEMENT OF JOINT RESEARCH AGREEMENT

The subject matter and the claimed invention were made by or on the behalf of Northwestern Polytechnical University, of West Youyi Road Xi'an, Shaanxi, P.R. China and Huawei Technologies Co., Ltd., of Shenzhen, Guangdong Province, P.R. China, under a joint research agreement titled "Research on Key MAC Technology for Next Generation WiFi Standard". The joint research agreement was in effect on or before the claimed invention was made, and that the claimed invention was made as a result of activities undertaken within the scope of the joint research agreement.

TECHNICAL FIELD

This application relates to the wireless local area network field, and more specifically, to a scheduling method, an access point, and a station.

BACKGROUND

Propelled by the rapid development of communications technologies, the Internet of Things (Internet of Things, IoT) has infiltrated into various aspects of work and life. When an IoT device is disposed on a wall or under a floor, a relatively large penetration loss is caused due to blockage, and consequently the IoT device consumes more power. The IoT device herein is a station (Station, STA). To overcome this problem, a trigger frame (Trigger Frame, TF) mechanism is usually used during data transmission currently. A STA enters doze state when the STA does not need to transmit data, thereby reducing power consumption of the STA. The STA releases a time-frequency resource, and an access point (Access Point, AP) triggers, by using a TF, another STA to use the time-frequency resource.

In an existing solution, when a STA needs to wake up from doze state to transmit data, the STA requests a time-frequency resource from an AP, and the AP schedules a time-frequency resource for the STA based on the request of the STA and triggers, by using a TF, the STA to use the corresponding time-frequency resource scheduled by the AP for the STA. In an existing resource scheduling method, a STA initiates a request to an AP, and dynamic network changes cannot be supported. This is unfavorable to coordination between the AP and the STA.

To improve transmission efficiency, multi-user uplink/downlink transmission may be introduced to a next-generation wireless local area network (Wireless Local Area Networks, WLAN). A trigger frame sent by an AP for scheduling multi-user uplink transmission may include two forms: a trigger frame used for non-contention access and a trigger frame used for contention access (also referred to as a trigger frame for random access (Trigger Frame for Random Access, TF-R)). The existing resource scheduling method cannot meet a requirement of the next-generation WLAN.

SUMMARY

This application provides a scheduling method, an access point, and a station, which are favorable to coordination between an AP and a STA, thereby achieving a better power consumption reducing effect.

According to a first aspect, this application provides a scheduling method, including: generating, by an access point (AP), a first frame, where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station (STA) corresponding to the first trigger frame; and broadcasting, by the AP, the first frame to at least one STA.

By using the scheduling method provided in this embodiment of this application, the AP broadcasts the first frame to notify the STA of the reservation information of each of the at least one trigger frame, where the reservation information includes the identifier and the start time of the trigger frame, and the constraint condition of the corresponding station STA. Dynamic network changes can be supported through unified scheduling of the AP, and this is favorable to coordination between the AP and the STA, thereby better reducing power consumption of the STA.

In a possible implementation of the first aspect, the at least one trigger frame includes at least one of a trigger frame used for contention access or a trigger frame used for non-contention access. Therefore, the solution of this implementation can be applied to contention access and/or non-contention access, so that unified scheduling of the AP is further enhanced.

In a possible implementation of the first aspect, the constraint condition includes user group information corresponding to the first trigger frame.

In a possible implementation of the first aspect, the constraint condition includes service type information corresponding to the first trigger frame.

In a possible implementation of the first aspect, the first frame further includes information used to indicate start time of a second frame.

In a possible implementation of the first aspect, the method further includes:
    sending, by the AP, the second frame to the at least one STA, where the start time of the second frame is earlier than the start time of the first trigger frame, and the second frame includes information used for indicating the at least one STA that the first trigger frame is deleted. Therefore, the solution of this implementation may be applied to a scenario in which traffic of a STA in a network changes dynamically. When the traffic in the network is decreased, required uplink resources decrease or transmission frequency is reduced. According to the solution of this implementation, resource configurations can be properly reduced.

In a possible implementation of the first aspect, the method further includes: obtaining, by the AP, information indicating that an error has occurred in uplink data transmission of a first STA; and sending, by the AP, a third frame to the first STA, where the third frame includes information used for instructing the first STA to perform retransmission at a first moment, and the third frame is a control frame. Therefore, the solution of this implementation can resolve a problem that resources within an agreed-on time are insufficient due to a transmission error.

In a possible implementation of the first aspect, the reservation information of the first trigger frame further includes information used to indicate whether the first trigger frame is a force-to-wake-up trigger frame or a non-force-to-wake-up trigger frame, and the method further includes: when the first trigger frame is a force-to-wake-up trigger frame, directly sending, by the AP, downlink data to the STA corresponding to the first trigger frame; or when the first trigger frame is a non-force-to-wake-up trigger frame, sending, by the AP, downlink data to the STA corresponding to the first trigger frame after receiving an uplink packet sent by the STA corresponding to the first trigger frame. Therefore, in the scheduling method of this implementation, reachability of the STA can be considered, to make a further agreement on wake-up of the STA, thereby further reducing power consumption of the STA.

In a possible implementation of the first aspect, the reservation information of the first trigger frame further includes information used to indicate that the first trigger frame is used for downlink transmission. Therefore, in the solution of this implementation, downlink transmission can also be considered.

In a possible implementation of the first aspect, the reservation information of the first trigger frame further includes information used to indicate an operation performed on the first trigger frame, and the operation includes addition, modification, or deletion. Therefore, the solution of this implementation features more flexible indication. This is more favorable to coordination between the AP and the STA.

In a possible implementation of the first aspect, the first frame further includes information used to indicate a quantity of the at least one trigger frame.

In a possible implementation of the first aspect, the reservation information of the first trigger frame is carried in a target wake time TWT element. Therefore, the solution of this implementation can be better compatible with the prior art.

In a possible implementation of the first aspect, the method further includes: sending, by the AP, a second trigger frame to each of the at least one STA, where the second trigger frame is a trigger frame with an earliest start time in a trigger frame group, the trigger frame group is used for contention access, and the second trigger frame includes information about a service type to which the trigger frame group is applicable, and a time resource and/or frequency resource allowed to be contended for by the applicable service type. Therefore, in the solution of this implementation, a configuration rule of a contention access resource can be set based on a service type of the STA, so that quality of service (Quality of Service, QoS) is flexibly controllable.

According to a second aspect, this application provides a scheduling method, including: receiving, by a station (STA), a first frame broadcast by an access point (AP), where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station STA corresponding to the first trigger frame; and transmitting, by the STA, uplink data based on the reservation information of the at least one trigger frame.

In a possible implementation of the second aspect, the method further includes: receiving, by the STA, a second frame sent by the AP, where start time of the second frame is earlier than the start time of the first trigger frame, and the second frame includes information used for indicating the STA that the first trigger frame is deleted.

In a possible implementation of the second aspect, the method further includes: transmitting, by the STA, uplink data to the AP; and receiving, by the STA, a third frame sent by the AP, where the third frame includes information used for instructing the STA to retransmit the uplink data at a first moment, and the third frame is a control frame.

In a possible implementation of the second aspect, the reservation information of the first trigger frame further includes information used to indicate whether the first trigger frame is a force-to-wake-up trigger frame or a non-force-to-wake-up trigger frame.

In a possible implementation of the second aspect, the method further includes: receiving, by the STA, a second trigger frame sent by the AP, where the second trigger frame is a trigger frame with an earliest start time in a trigger frame group, the trigger frame group is used for contention access, and the second trigger frame includes information about a service type to which the trigger frame group is applicable, and information about a time resource and/or frequency resource allowed to be contended for by the applicable service type; and performing, by the STA based on the information included in the second trigger frame, contention access and transmitting the uplink data.

In the various aspects of this application and the corresponding implementations, the first frame may be a beacon (Beacon) frame, or another management frame, control frame, wake-up frame, or the like. The STA may receive the first frame by using a radio device that is the same as that for receiving the first trigger frame, or may receive the first frame by using a radio device that is different from that for receiving the first trigger frame. This embodiment of this application sets no limitation thereto.

For beneficial effects of the second aspect and various possible designs of the second aspect, refer to the corresponding beneficial effects corresponding to the first aspect and corresponding features of the first aspect. Details are not described herein again According to a third aspect, this application provides an AP, including a processing module, a sending module, and a receiving module, configured to implement functions of actions of the AP in the foregoing aspects. The functions may be implemented by hardware or may be implemented by hardware executing corresponding software. The hardware or software includes one or more modules corresponding to the foregoing functions.

According to a fourth aspect, this application provides an AP, including a receiver, a transmitter, and a processor, configured to support the AP in performing corresponding functions in the foregoing method. The receiver and the transmitter are configured to support communication with a STA. The AP may further include a memory. The memory is configured to be coupled to the processor and stores a necessary program instruction and data.

According to a fifth aspect, this application provides a STA, including a receiving module and a sending module, configured to implement functions of actions of the STA in the foregoing aspects. The functions may be implemented by hardware or may be implemented by hardware executing corresponding software. The hardware or software includes one or more modules corresponding to the foregoing functions.

According to a sixth aspect, this application provides a STA, including a receiver, a transmitter and a processor, configured to support the STA in performing corresponding functions in the foregoing method. The receiver and the transmitter are configured to support communication with an AP. The STA may further include a memory. The memory is configured to be coupled to the processor and store a necessary program instruction and data.

DESCRIPTION OF EMBODIMENTS

The following describes technical solutions of this application with reference to the accompanying drawings.

Figure 1:
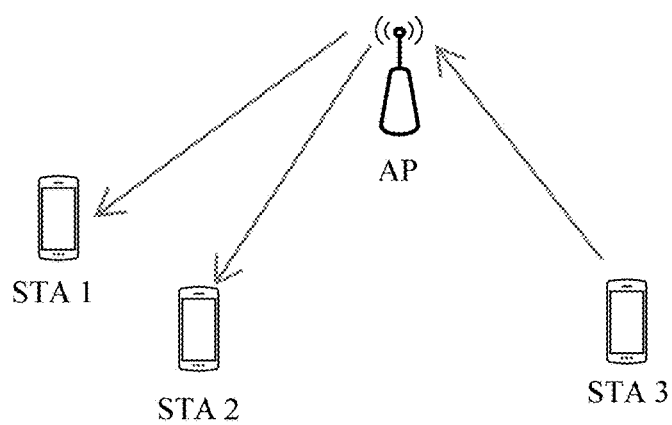
FIG. 1 is a schematic diagram of a typical application scenario of a WLAN.

FIG. 1 is a schematic diagram of a typical application scenario of a WLAN. As shown in FIG. 1, the WLAN includes an access point (Access Point, AP) and a station (Station, STA). The AP is responsible for performing bi-directional communication with a plurality of STAs. For example, an AP shown in FIG. 1 sends downlink data to a STA (for example, a STA 1 and a STA 2 in FIG. 1), or the AP receives uplink data from a STA (for example, a STA 3 in FIG. 1). It should be understood that quantities of APs and STAs shown in FIG. 1 are merely for an illustrative purpose, and the WLAN may include any quantities of APs and STAs.

An embodiment of this application provides a scheduling method. From a perspective of an AP, the method includes: generating, by the access point AP, a first frame, where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station STA corresponding to the first trigger frame; and broadcasting, by the AP, the first frame to at least one STA. Correspondingly, for each STA, the station STA receives a first frame broadcast by an access point AP, where the first frame includes reservation information of each of at least one trigger frame, reservation information of the first trigger frame in the at least one trigger frame includes an identifier of the first trigger frame, start time of the first trigger frame, and constraint conditions of all STAs corresponding to the first trigger frame, and the STA meets a constraint condition of the first trigger frame; and the STA transmits uplink data based on the reservation information of the at least one trigger frame.

The first frame may be a beacon (Beacon) frame or another management frame, control frame, wake-up frame, or the like. The STA may receive the first frame by using a radio device that is the same as that for receiving the first trigger frame, or may receive the first frame by using a radio device that is different from that for receiving the first trigger frame. This embodiment of this application sets no limitation thereto.

By using the scheduling method provided in this embodiment of this application, the AP broadcasts the first frame to notify the STA of the reservation information of each of the at least one trigger frame, where the reservation information includes the identifier and the start time of the trigger frame, and the constraint condition of the corresponding station STA. Dynamic network changes can be supported through unified scheduling of the AP, and this is favorable to coordination between the AP and the STA, thereby better reducing power consumption of the STA.

A beacon frame is used as an example of the first frame below to describe the embodiments of this application. Another scenario in which the first frame is a frame of another type is similar. Details are not described in this specification.

The reservation information of the at least one trigger frame in the beacon frame (including the reservation information of the first trigger frame) may be carried in a target wake time (Target Wake Time, TWT) element (element). Therefore, the solution of this implementation can be better compatible with the prior art.

The scheduling method in this embodiment of this application may specifically include: adding, by the AP, at least one of the following types of reservation information to a TWT element in a reservation domain (rsv) of the beacon frame:

an identifier of each TF (which may be, for example, a first trigger frame) used for non-contention access, start time of the TF, and a constraint condition of a station STA corresponding to the TF, where for the TF used for non-contention access, a specific implementation of the constraint condition may include user group information corresponding to the TF, namely, STA group information, and a specific form of the STA group information may be a STA group list; and an identifier of each TF in each round of TFs used for contention access, start time of the TF, and a constraint condition of a station STA corresponding to the TF, where for the TF used for contention access, a specific implementation of the constraint condition may include service type information corresponding to the TF.

In conclusion, the at least one trigger frame may include a trigger frame used for contention access and/or a trigger frame used for non-contention access. Therefore, the solution of this embodiment of this application is applicable to contention access and/or non-contention access, so that unified scheduling of the AP is further enhanced.

Optionally, to ensure that relatively high accuracy of the first frame is maintained in a transmission process, the first frame further includes information indicating a quantity of the at least one trigger frame, so that the STA can make reference during parsing.

Optionally, the first frame may further include information used to indicate start time of a second frame. The second frame may be a beacon frame, a short beacon (Short Beacon) frame, or another management frame, control frame, wake-up frame, or the like. The AP notifies the STA of the start time of the second frame by using the first frame, so that the second frame is subsequently used to notify the STA of reservation information used for adding, modifying, or deleting a trigger frame. In a specific implementation, the second frame may be a short beacon frame.

Figure 2:
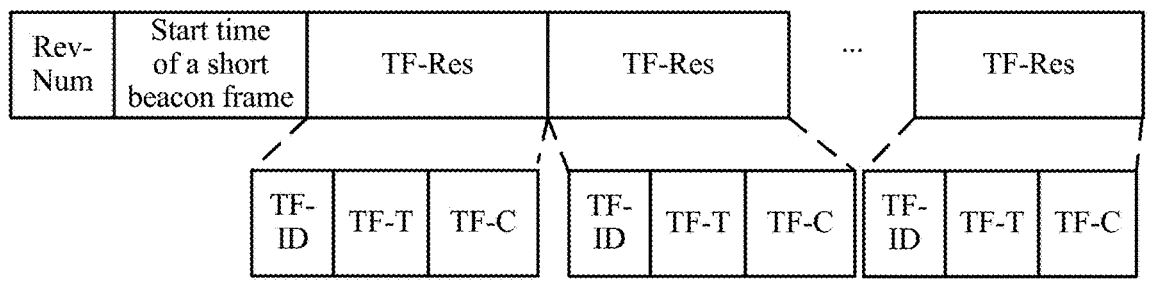
FIG. 2 is a schematic diagram of a form of a beacon frame structure according to an embodiment of this application.

A beacon frame structure is provided below by using a specific example. A form of the beacon frame structure may be shown in FIG. 2. Indication information that is in a beacon frame and that is related to reservation information of a TF may include:

information used to indicate a quantity of at least one trigger frame reserved in a current round, namely, Rev-Num, where the Rev-Num may occupy 4 bits; and
information used to indicate start time of a short beacon frame reserved in the current round, namely, a short beacon time, where the short beacon time may occupy 16 bits.

Reservation information TF-Res (TF Reservation) of each trigger frame includes:

an identifier TF-ID of the trigger frame, used to indicate a serial number of the current TF, where the TF-ID may occupy 4 bits;
start time TF-T (TF time) of the trigger frame, used to indicate an arrival time of the TF, where the TF-T may occupy 16 bits; and
a constraint condition TF-C (TF Class) of a station STA corresponding to the trigger frame, to indicate constraint information with which the STA corresponding to the TF needs to comply, for example, a user group list, a service type, or a service priority, where the TF-C may occupy 8 bits.

Figure 3:
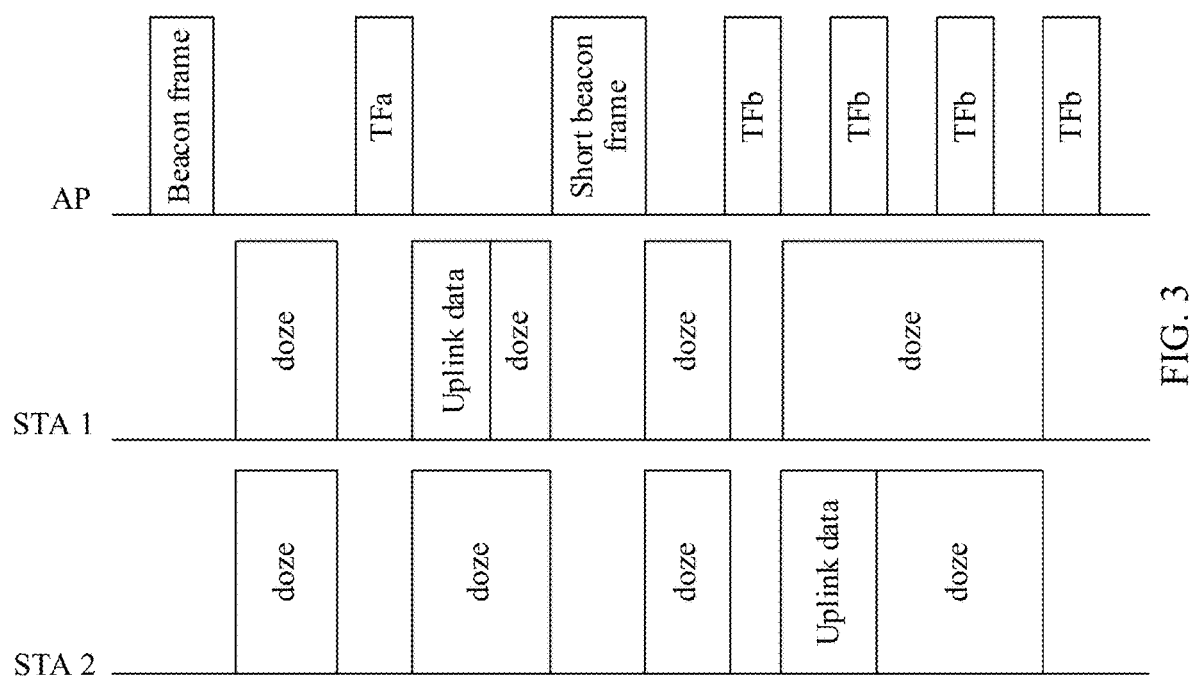
FIG. 3 is a schematic diagram of a scheduling method according to an embodiment of this application.

A specific example of a scheduling method is further provided, and is shown in FIG. 3. Operation steps of a STA and an AP are as follows:

The AP generates a first frame (which is, for example, a beacon frame). The beacon frame includes reservation information of each of at least one trigger frame. The beacon frame includes reservation information of one TFa used for non-contention access and four TFb used for contention access. The beacon frame includes identifiers and start time of the five TFs and constraint conditions of STAs corresponding to the TFs. The beacon frame further includes information about start time of a short beacon frame.

The AP broadcasts the foregoing beacon frame to at least one STA. After receiving the beacon frame sent by the AP, the STA obtains the information in the beacon frame through parsing. The AP schedules a STA 1 in the TFa, and the STA 1 has to-be-sent uplink data. The STA 1 wakes up before the TFa arrives. The STA 1 sends the uplink data on a resource following the TFa, and hibernates after completing sending the uplink data. The AP does not schedule a STA 2 in the TFa, and the STA 2 has to-be-sent uplink data. The STA 2 wakes up before a first TFb arrives, accesses a resource following the first TFb through random contention to send the uplink data, and hibernates after completing sending the uplink data.

Figure 4:
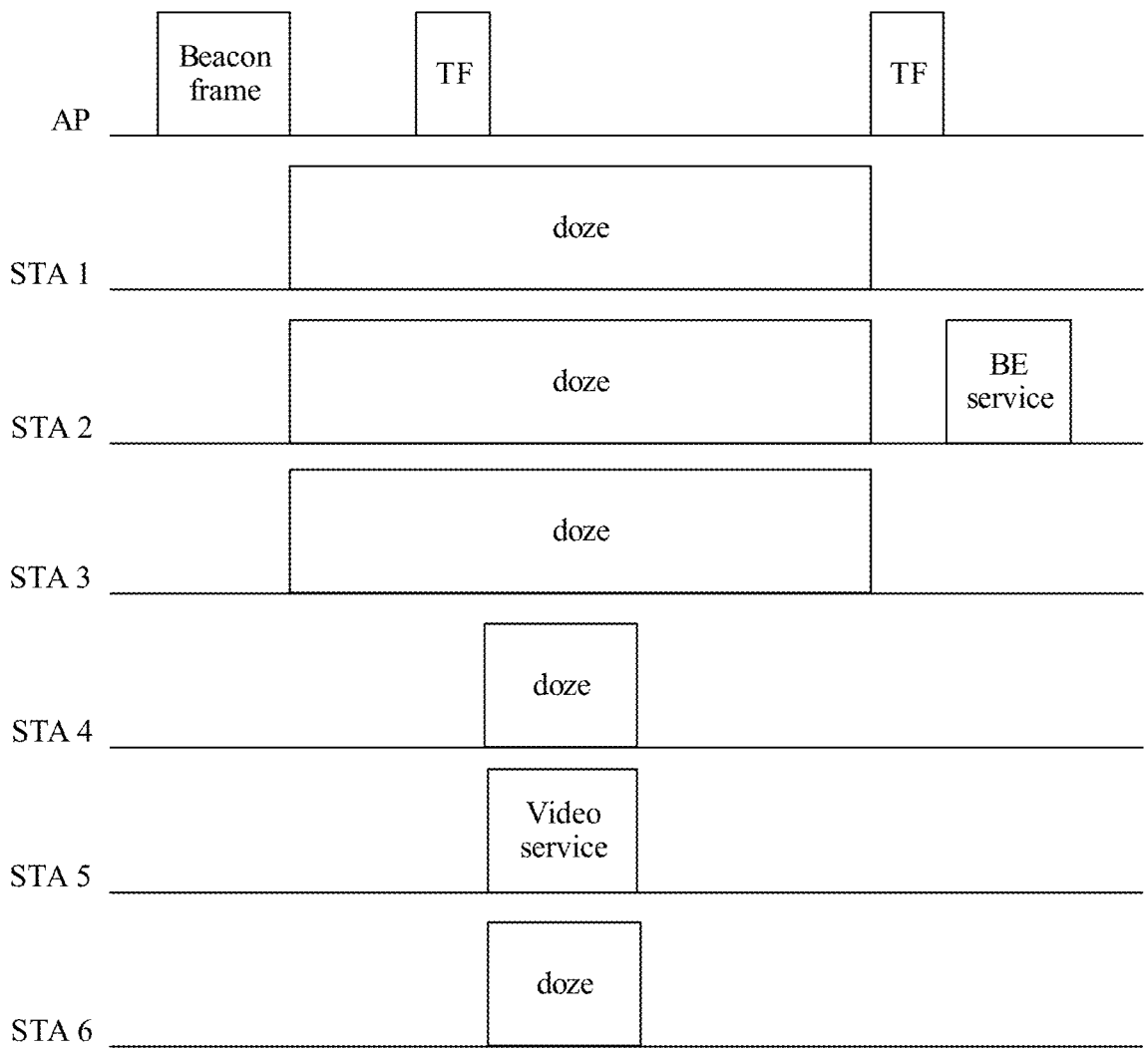
FIG. 4 is a schematic diagram of a scheduling method according to another embodiment of this application.

Another specific example of a scheduling method is further provided, and is shown in FIG. 4. Operation steps of a STA and an AP are as follows:

The AP generates a first frame (which is, for example, a beacon frame). The beacon frame includes reservation information of each of at least one trigger frame. The beacon frame includes reservation information of one TFb-1 used for contention access in a first round and reservation information of one TFb-2 used for contention access in a second round. A constraint condition of a STA corresponding to the one TFb-1 used for contention access in the first round indicates that the TFb-1 in the first round accepts only a time-sensitive service, and a constraint condition of a STA corresponding to the one TFb-2 used for contention access in the second round indicates that there is no service limitation.

A video service of a STA 5 is a time-sensitive service. After receiving the one TFb-1 used for contention access in the first round, the STA 5 performs random contention access to send the video service.

A best effort (Best Effort, BE) service of a STA 2 is a non-time-sensitive service. After receiving the one TFb-2 used for contention access in the second round, the STA 2 performs random contention to send the BE service.

In this embodiment of this application, the constraint condition limits a carried data type (service type), so that the STA obtains more sleep time while quality of service of a high-priority service is improved.

Optionally, the scheduling method of this embodiment of this application may further include: sending, by the AP, the second frame to the at least one STA, where the start time of the second frame is earlier than the start time of the first trigger frame, and the second frame includes information used for indicating the at least one STA that the first trigger frame is deleted. Correspondingly, the STA receives the second frame sent by the AP. The second frame may be a trigger frame, or may be another management frame, control frame, or acknowledgement frame; or may be a frame of another type. This embodiment of this application sets no limitation thereto.

Specifically, traffic of a STA in a network changes dynamically. When the traffic in the network is decreased, required uplink resources decrease or transmission frequency is reduced. In this case, the network needs fewer TFs compared with TFs required at a peak traffic value. In this embodiment of this application, a deletion function may be added on a basis of the method of FIG. 3, to meet the foregoing requirement. The AP performs the following operation in the second frame based on a network load status: deleting one or more TFs based on start time or a start time list of the TF or an ID of the TF.

Figure 5:
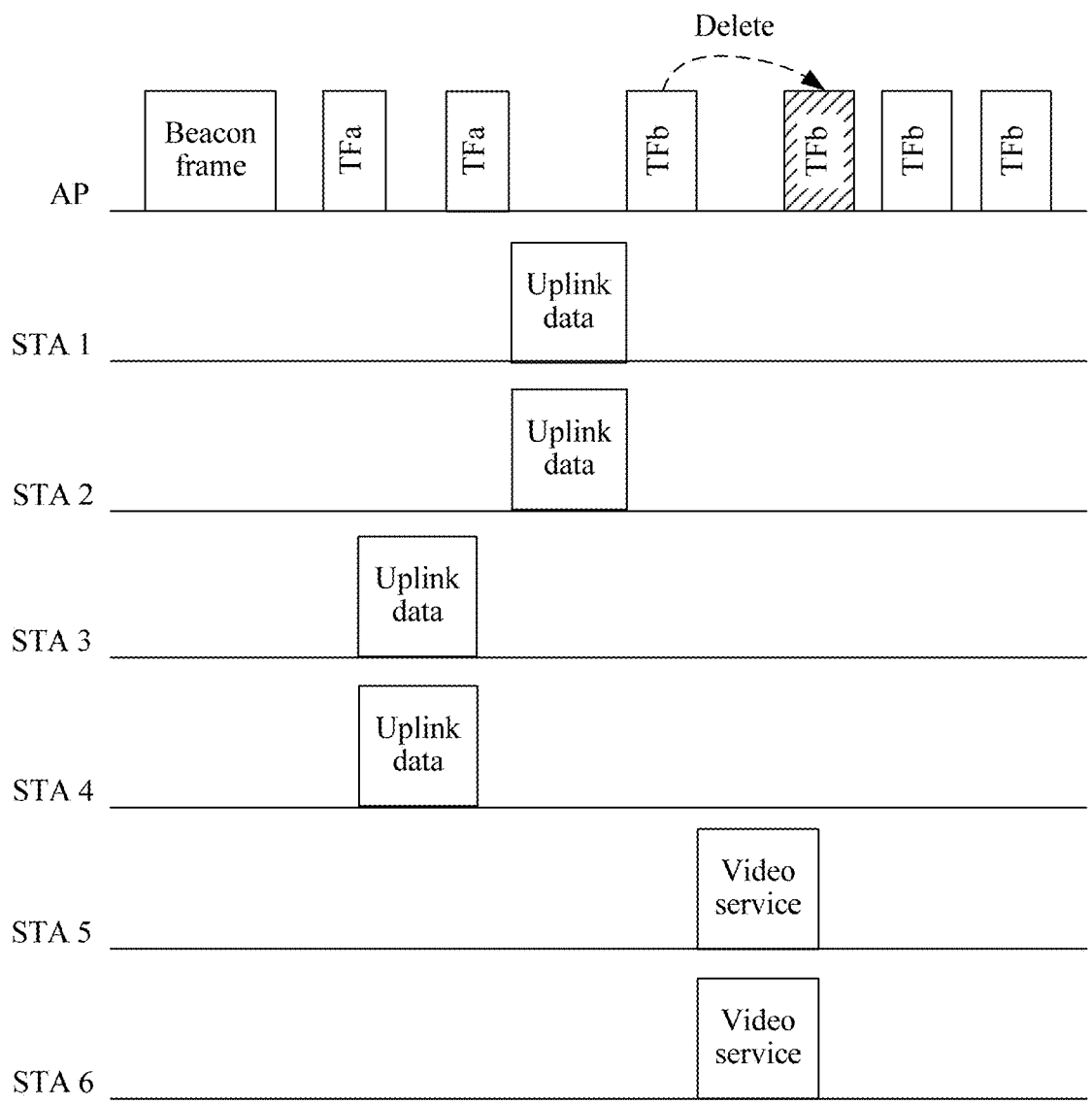
FIG. 5 is a schematic diagram of a scheduling method according to still another embodiment of this application.

A specific example of another scheduling method is shown in FIG. 5. Operation steps of a STA and an AP are as follows:

A STA 1 to a STA 6 receive a beacon frame sent by the AP and obtain reservation information of a TF in the beacon frame through parsing. The TF includes reservation information of two TFa used for non-contention access and four TFb used for contention access.

The AP schedules the STA 1 and the STA 2 in a second TFa used for non-contention access, and the STA 1 and the STA 2 have to-be-sent uplink data. The STA 1 and the STA 2 wake up before the second TFa used for non-contention access arrives, send the uplink data on a resource following the second TFa used for non-contention access, and hibernate after completing sending the uplink data.

The AP schedules the STA 3 and the STA 4 in a first TFa used for non-contention access, and the STA 3 and the STA 4 have to-be-sent uplink data. The STA 3 and the STA 4 wake up before the first TFa used for non-contention access arrives, send the uplink data on a resource following the first TFa used for non-contention access, and hibernate after completing sending the uplink data.

If the AP needs to delete, based on a network load status, a second TFb used for contention access, information used for deleting the second TFb used for contention access may be added to a first TFb used for contention access. After receiving the first TFb used for contention access, the STA can learn that there is no original second TFb used for contention access any longer. In this case, the STA 5 and the STA 6 that have an uplink video (video) service may choose to perform contention access while receives the first TFb used for contention access.

Group information may be added to the beacon frame. Each group has a TF ID list. The following operation may be performed in the second frame: for TFs in a group, deleting one or more TFs based on start time or a start time list of the TF or an ID of the TF. When a TF in a group needs to be deleted, deletion information can only be carried in the TF in this group.

Figure 6:
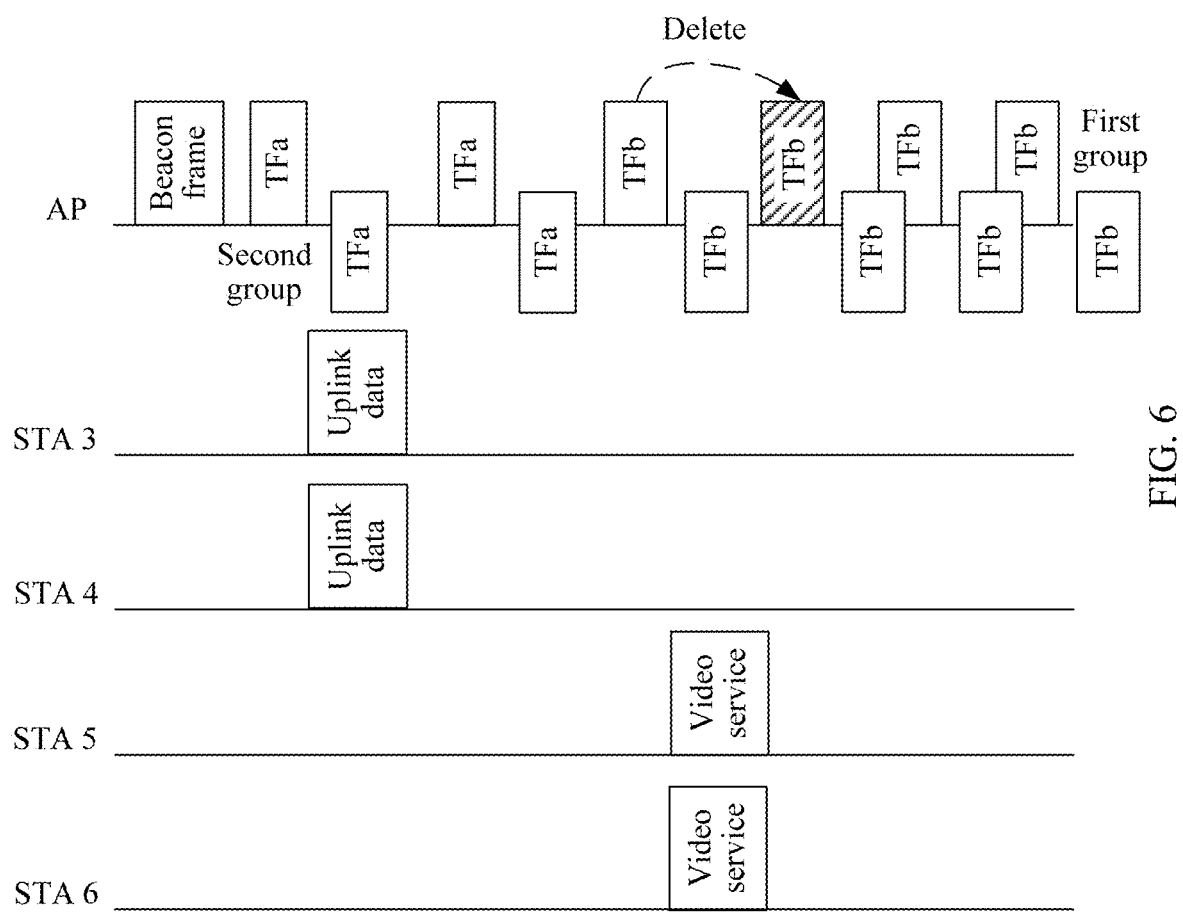
FIG. 6 is a schematic diagram of a scheduling method according to still another embodiment of this application.

A specific example of another scheduling method is shown in FIG. 6. In the figure, two groups are included: a first group and a second group. Operation steps of a STA and an AP are as follows:

The AP schedules a STA 3 and a STA 4 in a first TFa used for non-contention access in the first group, and the STA 3 and the STA 4 have to-be-sent uplink data. The STA 3 and the STA 4 wake up to receive the first TFa used for non-contention access in the first group, send the uplink data on a resource following the first TFa used for non-contention access in the first group, and hibernate after completing sending the uplink data.

If the AP needs to delete, based on a network load status, a second TFb used for contention access in the first group, information used for deleting the second TFb used for contention access in the first group may be added to a first TFb used for contention access in the first group. After receiving the first TFb used for contention access in the first group, the STA can learn that there is no second TFb used for contention access in the first group any longer. In this case, a STA 5 and a STA 6 that have an uplink video (video) service may choose to perform contention access while receives the first TFb used for contention access in the first group.

Further, the scheduling method in this embodiment of this application may further include: transmitting, by the STA, uplink data to the AP; obtaining, by the AP, information indicating that an error has occurred in uplink data transmission of a first STA; and sending, by the AP, a third frame to the first STA, where the third frame includes information used for instructing the first STA to perform retransmission at a first moment, and the third frame is a control frame. Correspondingly, the STA receives the third frame sent by the AP.

Figure 7:
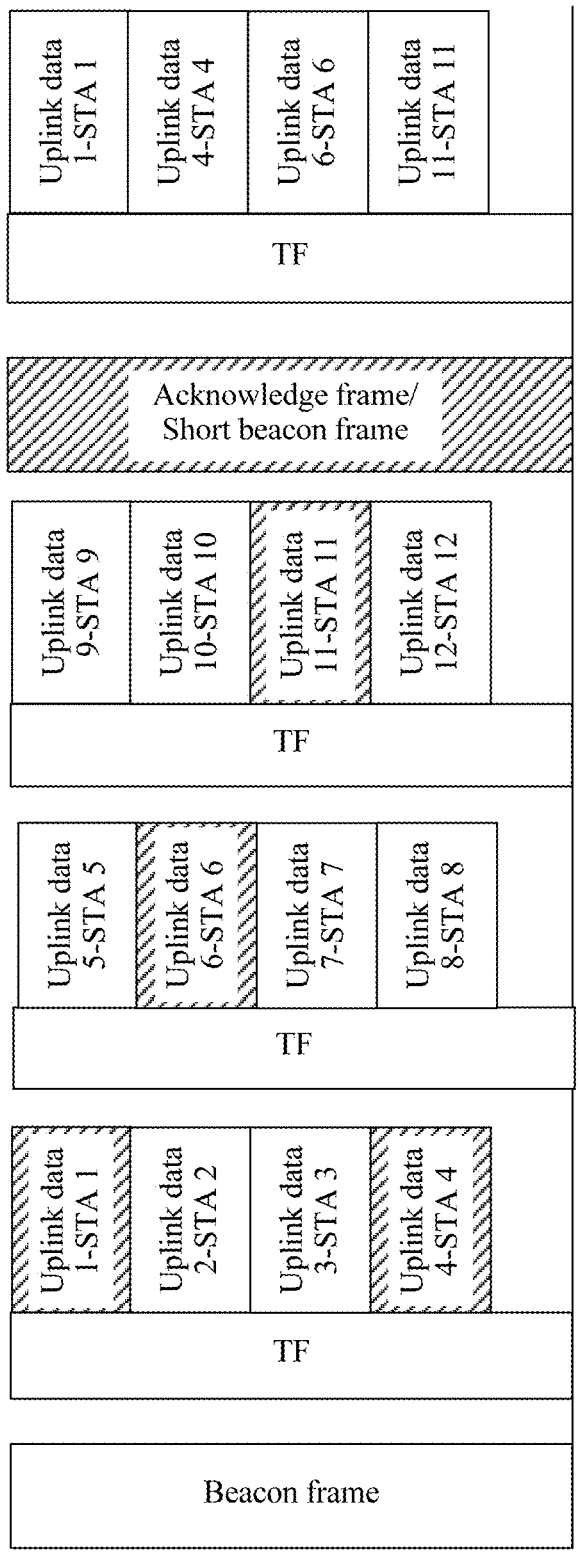
FIG. 7 is a schematic diagram of a scheduling method according to still another embodiment of this application.

Specifically, this embodiment of this application may further resolve a problem that resources are insufficient within an agreed-on time because of a transmission error. As shown in FIG. 7, when a STA in a TF has a large quantity of transmitted MAC protocol data units (MAC Protocol Data Unit, MPDU) that need to be retransmitted, if retransmission is performed immediately, a subsequent TF is delayed, and a STA in the subsequent TF needs to wait for a long time before waking up at a predetermined time, thereby causing extremely large power consumption.

In this embodiment of this application, when data of some STAs (for example, the first STA) is only partially sent or not received successfully, the AP obtains information indicating that an error has occurred in uplink data transmission, comprehensively considers information, collected within a specific period of time, indicating that an error has occurred in uplink data transmission, and re-arranges a sending opportunity. This ensures that reserved times of other STAs remain unchanged and maximizes power saving (power saving).

A specific example of the scheduling method is shown in FIG. 7. Operation steps of a STA and an AP are as follows:

A STA 1 to a STA 12 receive a beacon frame sent by the AP and obtain reservation information of a TF in the beacon frame through parsing. An error occurs in uplink data transmission of the STA 1, STA 4, STA 6, and STA 11. After collecting the foregoing information, the APP re-arranges sending opportunities for the STA 1, STA 4, STA 6, and STA 11.

The AP indicates, in a third frame that is sent, for example, an acknowledgement (Acknowledge, ACK) frame or a short beacon (Short Beacon) frame, that there is still a TF at a subsequent moment (for example, the first moment), to notify a STA that fails to send data that there is still an opportunity to send uplink data. When the TF arrives, the STA sends the uplink data when being called.

Optionally, in an embodiment, the reservation information of the first trigger frame further includes information used to indicate that the first trigger frame is used for downlink transmission.

Specifically, two domains may be carried in a common info field of a TF, one for indicating whether there is downlink data transmission in a current TF (for example, the first TF), and one for indicating a service indication map (Traffic Indication Map, TIM) in the current TF. If the STA detects, in the domain of the TF, that there is downlink data transmission in the TF, the STA then reads the TIM and sends a PS-POLL frame to the AP. The AP then sends downlink data. If the STA detects, in the domain of the TF, that there is no downlink data transmission in the TF, the STA does not need to read the TIM (the TF frame does not include the TIM), and a STA that receives the TF sends uplink data.

Figure 8:
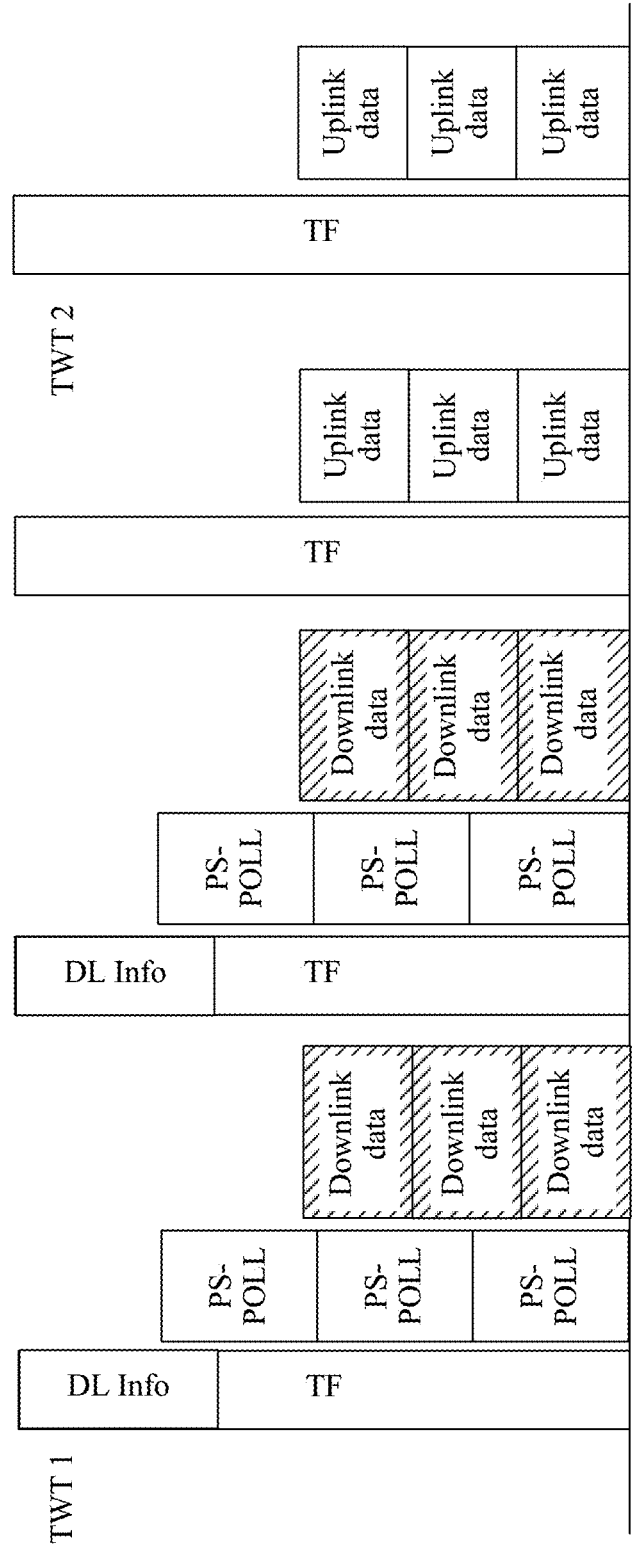
FIG. 8 is a schematic diagram of a scheduling method according to still another embodiment of this application.

A specific example of another scheduling method is shown in FIG. 8. A STA has both a processing method for uplink data receiving and a processing method for downlink data sending. Operation steps of the STA and an AP are as follows:

First two TFs in a TWT 1 include information DL (DownLoad) Info used to indicate that the TFs are used for downlink transmission. After reading the information in the TFs, the STA sends a power saving-poll (Power Saving-POLL, PS-POLL) frame. Then, the AP sends downlink data. A last TF does not include information used to indicate that the TF is used for downlink transmission. Then, after receiving the TF, the STA directly sends uplink data.

A TF in a TWT 2 does not include information used to indicate that the TF is used for downlink transmission. After receiving the TF, the STA directly sends uplink data.

Optionally, in an embodiment, the reservation information of the first trigger frame further includes information used to indicate whether the first trigger frame is a forceto-wake-up trigger frame or a non-force-to-wake-up trigger frame, and the scheduling method may further include: when the first trigger frame is a force-to-wake-up trigger frame, directly sending, by the AP, downlink data to the STA corresponding to the first trigger frame; or when the first trigger frame is a non-force-to-wake-up trigger frame, sending, by the AP, downlink data to the STA corresponding to the first trigger frame after receiving an uplink packet sent by the STA corresponding to the first trigger frame.

Specifically, in the scheduling method in this embodiment of this application, reachability of the STA can be considered, to make a further agreement on wake-up of the STA. If it cannot be ensured that the STA wakes up, uplink and downlink resources need to be allocated to the STA after the STA is queried or uplink information of the STA indicating that the STA wakes up is received. If it can be ensured that the STA wakes up, uplink and downlink resources are directly allocated without a need to query the STA.

A case described in this embodiment of this application is as follows: a TWT level (force-to-wake-up or non-force-to-wake-up) is set in a TWT element, and information used to indicate that a TF is used for downlink transmission and a TIM are carried in the TF. This mechanism is favorable to unified and clear indication of uplink and downlink sending, TWT indication is more flexible, and the STA can better hibernate.

The TWT level is set in the TWT element. Specifically, a flag bit may be set in a setup command of a TWT, to set different levels for the TWT. For example:

The non-force-to-wake-up trigger frame is set to that a STA may wake up if there is uplink data, and the STA may not wake up if there is no uplink data. The force-to-wake-up trigger frame is set as follows: A STA wakes up regardless of whether there is uplink data (after waking up, the STA may receive downlink data or perform a TWT modification operation or the like).

When the TWT is set to a non-force-to-wake-up trigger frame, the AP sends a TF to notify which STA has uplink data, and the notified STA sends the uplink data. When the TWT is set to a force-to-wake-up trigger frame, a STA wakes up regardless of whether the STA has uplink data or downlink data or in another case. After waking up, the STA parse a TF to determine whether there is addition, modification, or deletion.

When the TWT is set to a non-force-to-wake-up trigger frame, the AP needs to first receive uplink transmission from the STA, and then the AP sends downlink data to the STA or performs dedicated uplink allocation. The uplink transmission represents that the STA has woken up from a sleep state. When the TWT is set to a force-to-wake-up trigger frame, the STA definitely wakes up, and the AP does not need to wait for uplink transmission from the STA to send downlink data to the STA or perform dedicated uplink allocation.

Figure 9:
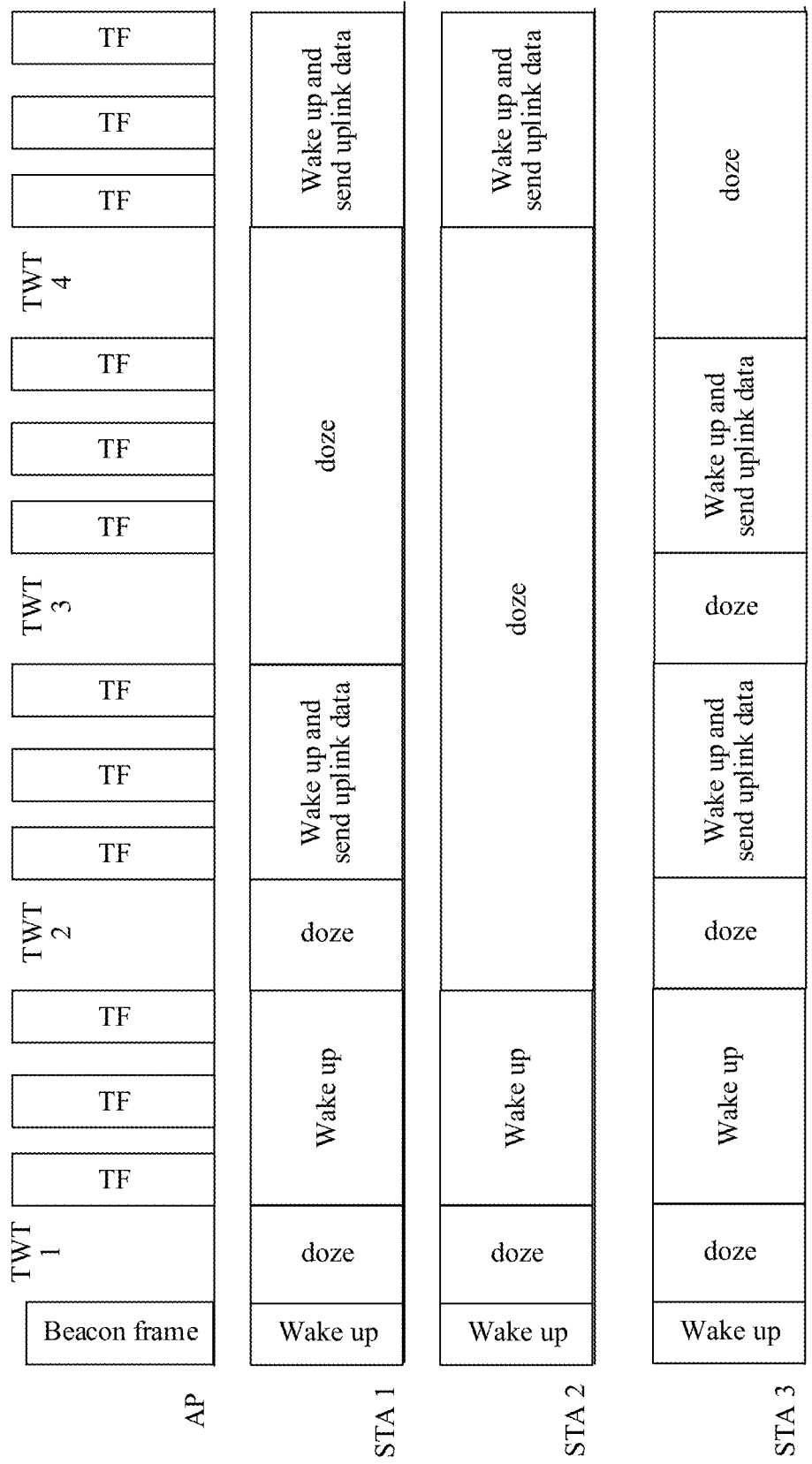
FIG. 9 is a schematic diagram of a scheduling method according to still another embodiment of this application.

FIG. 9 shows TWT setting in the scheduling method in this embodiment of this application. Operation steps of a STA and an AP are as follows:

The AP includes four TWT indications (reservation information of trigger frames) in a beacon frame. A first trigger frame is a force-to-wake-up trigger frame, and the other three trigger frames are non-force-to-wake-up trigger frames. In the first force-to-wake-up trigger frame, a STA 1, a STA 2, and a STA 3 all wake up. In a first non-force-to-wake-up trigger frame, the STA 2 has no to-be-transmitted data and is always in doze state until there is to-be-transmitted uplink data in a third force-to-wake-up trigger frame, and switches to a working state and sends the uplink data.

Optionally, in an embodiment, the reservation information of the first trigger frame further includes information used to indicate an operation performed on the first trigger frame, and the operation includes addition, modification, or deletion.

Specifically, the first frame includes the reservation information of each of the at least one trigger frame, the first trigger frame is any one of the at least one trigger frame, and the reservation information of the first trigger frame includes the identifier of the first trigger frame, the start time of the first trigger frame, and the constraint condition of the station STA corresponding to the first trigger frame; and may further include the information used to indicate the operation performed on the first trigger frame, where the operation includes addition, modification, or deletion.

Figure 10:
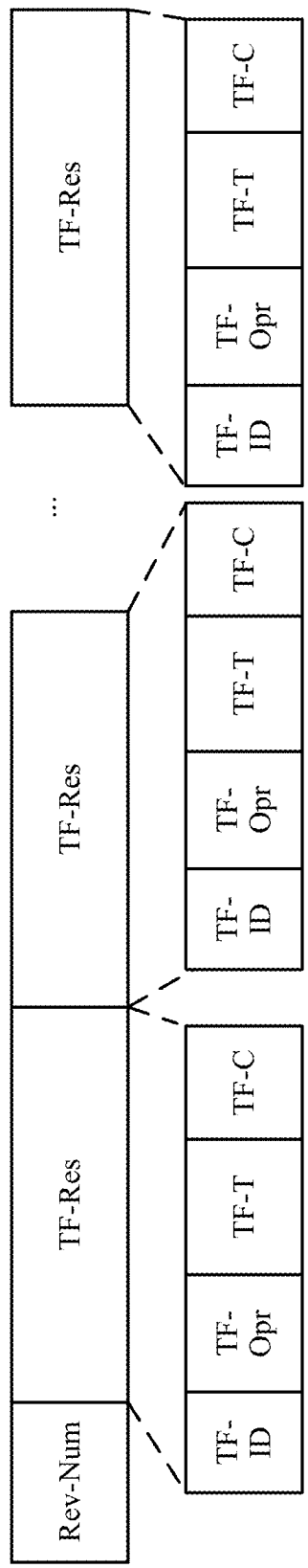
FIG. 10 is a schematic diagram of a form of a beacon frame structure according to another embodiment of this application.

The first frame may be a beacon frame or a short beacon frame. A specific format of the first frame may be shown in FIG. 10. The beacon frame may include information used to indicate a quantity of at least one trigger frame reserved in a current round (in other words, operation actions that need to be performed), namely, Rev-Num, where the Rev-Num may be 4 bits, 8 bits, or the like. The reservation information TF-Res (TF Reservation) of each trigger frame includes an identifier TF-ID of the trigger frame, start time TF-T (TF time) of the trigger frame, and a constraint condition TF-C (TF Class) of a station STA corresponding to the trigger frame. The TF-Res may further include an operation information indication domain that carries information TF-Opr used to indicate an operation performed on the TF.

The TF-ID is used to indicate an ID of a TF on which an operation needs to be operated. The TF-T (0 or 16 bits) is used to indicate start time of an updated TF, and no TF-T indication is required when the operation is deletion. The TF-C (0 or 8 bits) is used to indicate a constraint condition of a station STA corresponding to the updated TF, and no indication is required when the operation is deletion. The TF-Opr (2 bits) is used to indicate an operation that needs to be performed. For example, 00 represents addition, 01 represents modification, and 10 represents deletion.

The AP notifies the STA of a resource scheduling status by using a relatively large beacon frame that is also referred to as a full-size beacon frame, and notifies the STA of a resource scheduling update status by using the foregoing beacon frame that indicates the operation performed on the TF and that is also referred to as a compressed beacon frame. The STA obtains all information about resource scheduling based on the full-size beacon frame and the compressed beacon frame, for example, information about TF addition, modification, or deletion. In addition, the STA may restore incremental information from the compressed beacon frame, for example, specific information about TF modification. In this way, a total size of a beacon frame in a whole process can be reduced. This is favorable to design of a beacon frame for narrowband IoT.

Optionally, in an embodiment, the method may further include: sending, by the AP, a second trigger frame to each of the at least one STA, where the second trigger frame is a trigger frame with an earliest start time in a trigger frame group, the trigger frame group is used for contention access, and the second trigger frame includes information about a service type to which the trigger frame group is applicable, and a time resource and/or frequency resource allowed to be contended for by the applicable service type.

Correspondingly, the STA receives the second trigger frame sent by the AP, where the second trigger frame is the trigger frame with the earliest start time in the trigger frame group, the trigger frame group is used for contention access, and the second trigger frame includes the information about the service type to which the trigger frame group is applicable, and the information about the time resource and/or frequency resource allowed to be contended for by the applicable service type; and the STA performs contention access based on the information included in the second trigger frame and transmits the uplink data.

Figure 11:
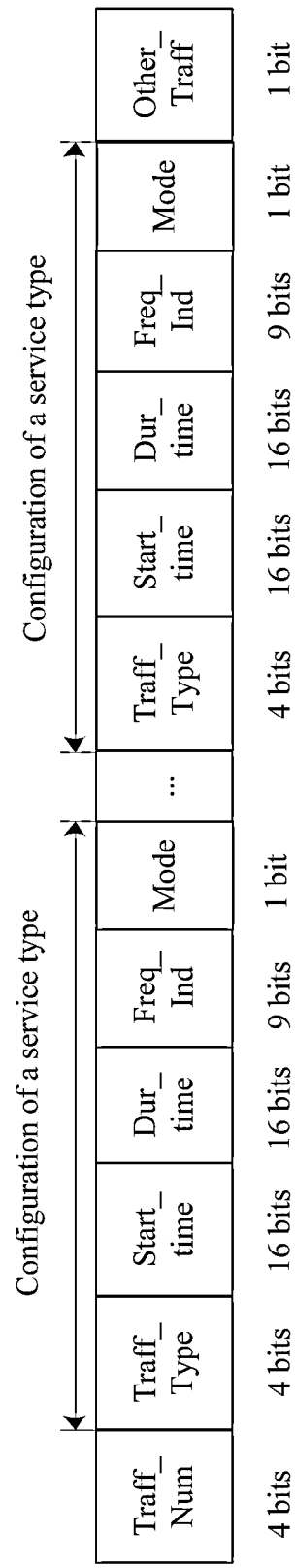
FIG. 11 is a schematic diagram of a scheduling method according to still another embodiment of this application.

Specifically, a carried data type (service type) may be limited in the second trigger frame, so that the STA obtains more sleep time while quality of service of a high-priority service is improved. In this mechanism, a configuration rule of a contention access resource can be set based on a service type of the STA, so that quality of service (Quality of Service, QoS) is flexibly controllable. Details may be shown in FIG. 11.

An AP may add the following information to a first TF in a TF group used for contention access:

Traff_Num: 4 bits, used to indicate that an available access resource needs to be configured for Traff_Num types of services;

Traff_Type: 4 bits, used to distinguish service types, where Traff_Types of different service types are different;

Start_time: 16 bits, start time when a service type allows contention access, where a unit is microsecond;

Dur_time: 16 bits, duration in which a service type allows contention access, where a unit is microsecond;

Freq_Ind: 9 bits, a frequency resource configuration for the service type that allows contention access, where for example, Freq_Ind may include a total of 9 bits that are corresponding to nine resource units (Resource Unit, RU) with 26 subcarriers, and a bit that is set to 1 represents that one resource unit (Resource Unit, RU) of the nine RUs allows contention access;

Mode: 1 bit, where for example, when Mode is 0 (default), it indicates that time and frequency ranges specified by the foregoing bits are allowed access ranges; and when Mode is 1, it indicates that the time and frequency ranges are forbidden access ranges, and another resource is an allowed access range; and Other_Traff: 1 bit, where overall configuration is performed on other services that are not configured, for example, when Other_Traff is 0, it indicates that a current TF group does not allow contention access; and when Other_Traff is 1, it indicates that the current TF group allows contention access and a resource is not limited.

After receiving the foregoing information carried by the first TF in the TF group, the STA performs contention access in a specific time and RU based on configured content, and may enter doze state in other times.

Figure 12:
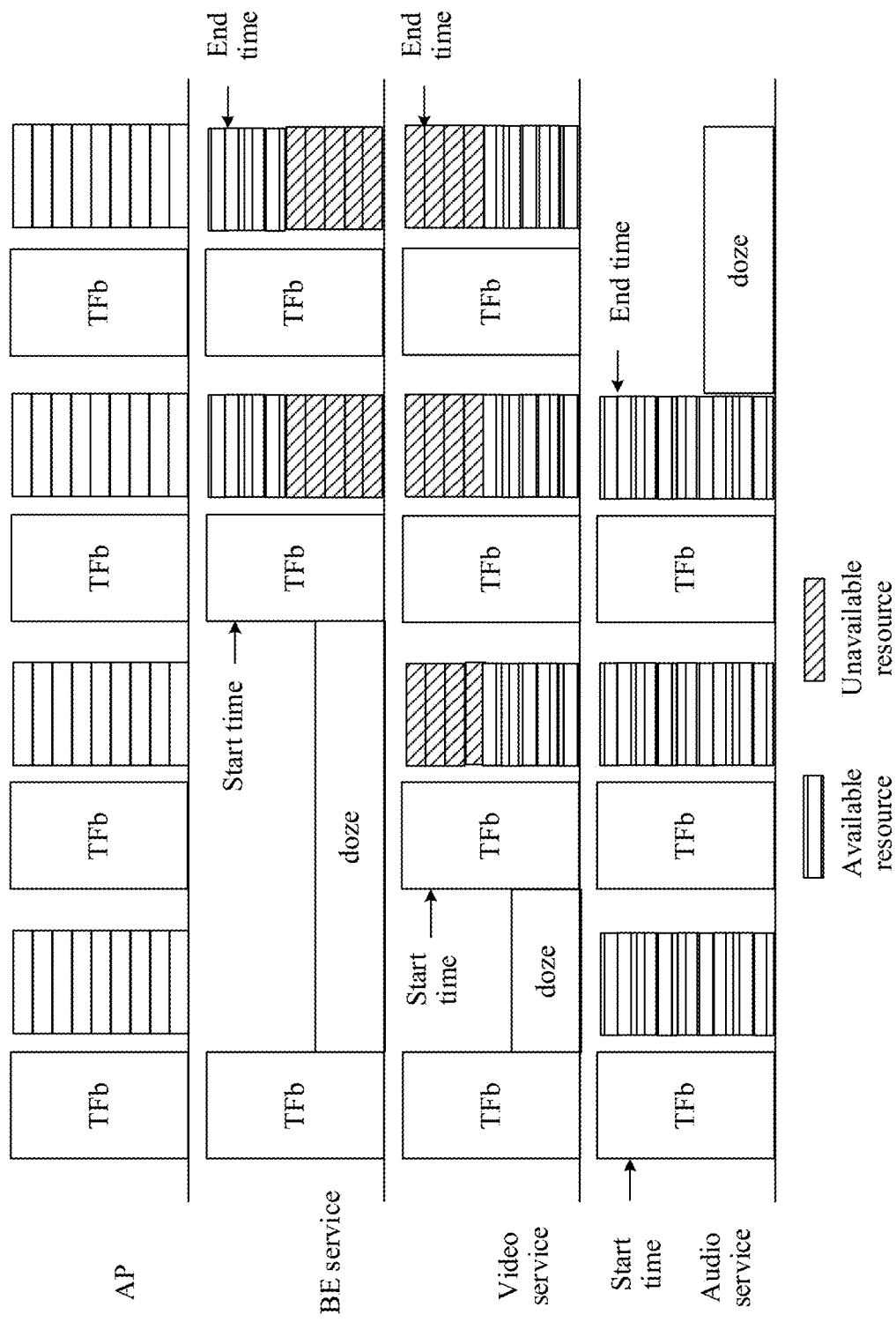
FIG. 12 is a schematic diagram of a scheduling method according to still another embodiment of this application.

A specific example is shown in FIG. 12. Operation steps of a STA and an AP are as follows:

The AP configures start time, duration, and frequency resource allocation of contention access of a BE service, a video service, and an audio service in a first TF in a TF group. The STA performs contention access based on a service type of the STA.

Figure 13:
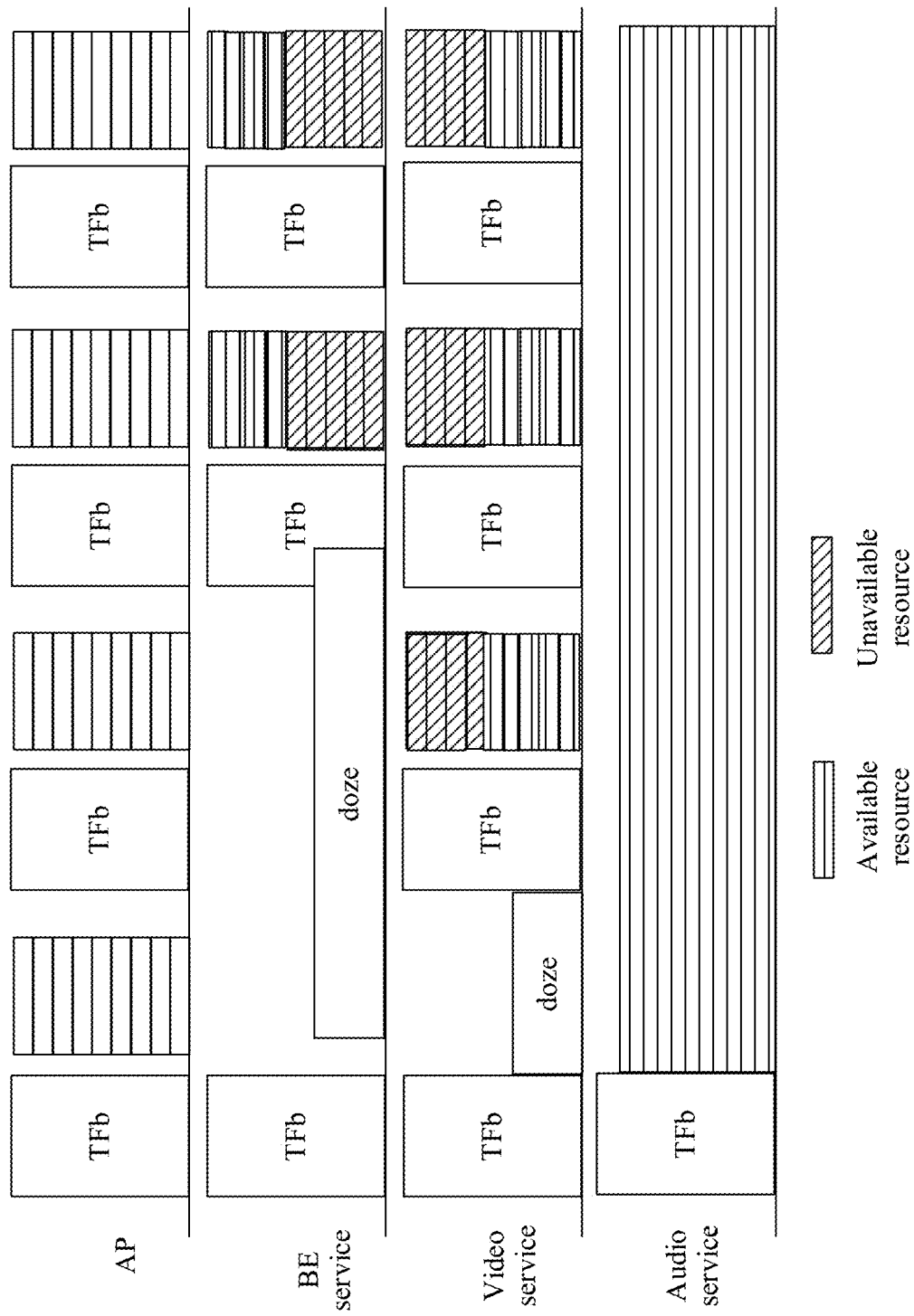
FIG. 13 is a schematic diagram of a scheduling method according to still another embodiment of this application.

Another specific example is shown in FIG. 13. Other_Traff=1, and operation steps of a STA and an AP are as follows:

Start time, duration, and frequency resource allocation of contention access of a BE service and a video service are configured in a first TF in a TF group. An unconfigured audio service may perform contention access by using unlimited resources.

Figure 14:
FIG. 14 is a schematic diagram of a scheduling method according to still another embodiment of this application.

Another specific example is shown in FIG. 14. Other_Traff=0, and operation steps of a STA and an AP are as follows:

Start time, duration, and frequency resource allocation of contention access of a video service and an audio service are configured in a first TF in a TF group. An unconfigured BE service is not allowed to perform contention access.

It should be understood that in this embodiment of this application, each domain in the first frame and the quantity of bits occupied by each domain are merely examples, and are not intended to limit this embodiment of this application.

Figure 15:
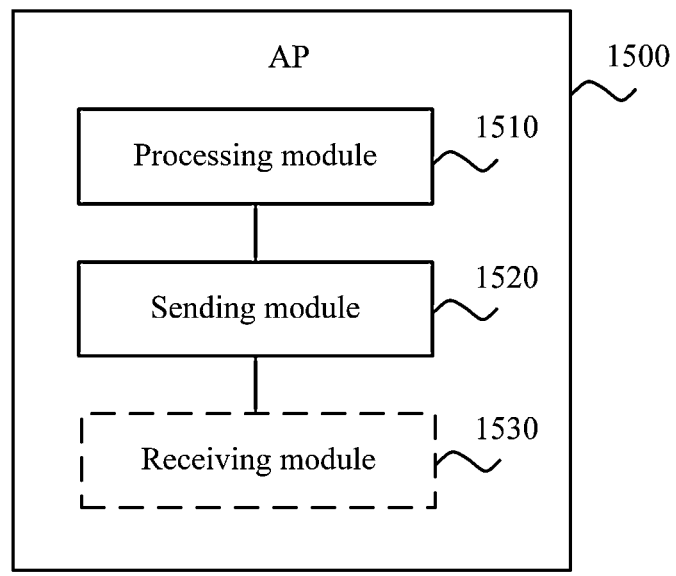
FIG. 15 is a schematic block diagram of an AP according to an embodiment of this application.

FIG. 15 is a schematic block diagram of an AP 1500 according to an embodiment of this application. As shown in FIG. 15, the AP 1500 includes:

a processing module 1510, configured to generate a first frame, where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station (STA) corresponding to the first trigger frame; and a sending module 1520, configured to broadcast the first frame generated by the processing module 1510 to at least one STA.

Optionally, in an embodiment, the at least one trigger frame may include a trigger frame used for contention access and/or a trigger frame used for non-contention access.

Optionally, in an embodiment, the constraint condition includes user group information corresponding to the first trigger frame.

Optionally, in an embodiment, the constraint condition includes service type information corresponding to the first trigger frame.

Optionally, in an embodiment, the first frame may further include information used to indicate start time of a second frame.

Optionally, in an embodiment, the sending module 1520 is further configured to:

send the second frame to the at least one STA, where the start time of the second frame is earlier than the start time of the first trigger frame, and the second frame includes information used for indicating the at least one STA that the first trigger frame is deleted.

Optionally, in an embodiment, the AP further includes:

a receiving module 1530, configured to obtain information indicating that an error has occurred in uplink data transmission of a first STA; and the sending module 1520 is further configured to send a third frame to the first STA, where the third frame includes information used for instructing the first STA to perform retransmission at a first moment, and the third frame is a control frame.

Optionally, in an embodiment, the reservation information of the first trigger frame further includes information used to indicate whether the first trigger frame is a force-to-wake-up trigger frame or a non-force-to-wake-up trigger frame; and when the first trigger frame is a force-to-wake-up trigger frame, the sending module 1520 is further configured to directly send downlink data to the STA corresponding to the first trigger frame; or when the first trigger frame is a non-force-to-wake-up trigger frame, the receiving module 1530 is further configured to receive an uplink packet sent by the STA corresponding to the first trigger frame, and the sending module 1520 is further configured to send downlink data to the STA corresponding to the first trigger frame after the receiver receives the uplink packet sent by the STA corresponding to the first trigger frame.

Optionally, in an embodiment, the reservation information of the first trigger frame further includes information used to indicate that the first trigger frame is used for downlink transmission.

Optionally, in an embodiment, the reservation information of the first trigger frame further includes information used to indicate an operation performed on the first trigger frame, and the operation includes addition, modification, or deletion.

Optionally, in an embodiment, the first frame further includes information used to indicate a quantity of the at least one trigger frame.

Optionally, in an embodiment, the reservation information of the first trigger frame is carried in a target wake time TWT element.

Optionally, in an embodiment, the sending module 1520 is further configured to:

send a second trigger frame to each of the at least one STA, where the second trigger frame is a trigger frame with an earliest start time in a trigger frame group, the trigger frame group is used for contention access, and the second trigger frame includes information about a service type to which the trigger frame group is applicable, and a time resource and/or frequency resource allowed to be contended for by the applicable service type.

Figure 16:
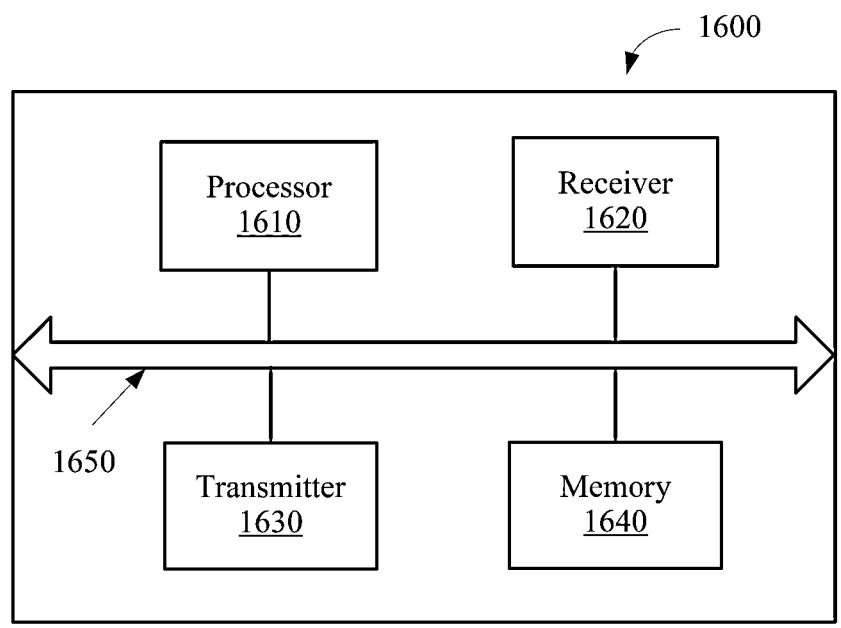
FIG. 16 is a schematic block diagram of an AP according to another embodiment of this application.

It should be noted that in this embodiment of this application, the receiving module 1530 may be implemented by a receiver, the sending module 1520 may be implemented by a transmitter, and the processing module 1510 may be implemented by a processor. As shown in FIG. 16, an AP 1600 may include a processor 1610, a receiver 1620, a transmitter 1630, and a memory 1640. The memory 1640 may be configured to store code and the like executed by the processor 1610.

The components in the AP 1600 are coupled by using a bus system 1650. In addition to a data bus, the bus system 1650 further includes a power bus, a control bus, and a status signal bus.

The AP 1500 shown in FIG. 15 or the AP 1600 shown in FIG. 16 can implement the processes implemented in the embodiments of FIG. 2 to FIG. 14. To avoid repetition, details are not described herein again.

It should be noted that the foregoing method embodiments of this application may be applied to a processor, or implemented by a processor. The processor may be an integrated circuit chip and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. For example but not for limitation, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the systems and methods described in this specification includes but is not limited to these and any memory of another proper type.

Figure 17:
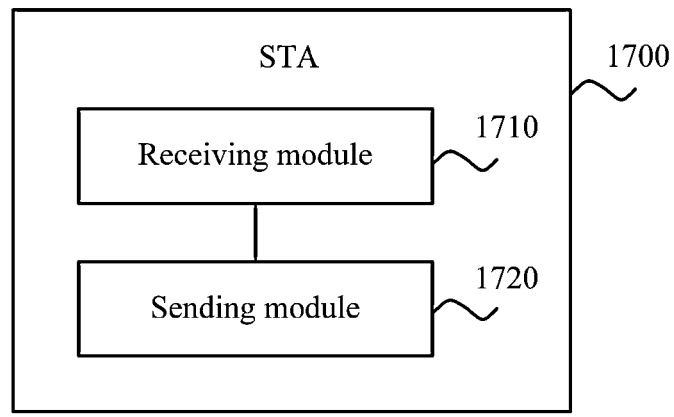
FIG. 17 is a schematic block diagram of a STA according to an embodiment of this application.

FIG. 17 is a schematic block diagram of a STA 1700 according to an embodiment of this application. As shown in FIG. 17, the STA 1700 includes:

a receiving module 1710, configured to receive a first frame broadcast by an access point AP, where the first frame includes reservation information of each of at least one trigger frame, a first trigger frame is any one of the at least one trigger frame, and reservation information of the first trigger frame includes an identifier of the first trigger frame, start time of the first trigger frame, and a constraint condition of a station STA corresponding to the first trigger frame; and a sending module 1720, configured to transmit uplink data based on the reservation information of the at least one trigger frame.

Optionally, in an embodiment, the receiving module 1710 is further configured to:

receive a second frame sent by the AP, where start time of the second frame is earlier than the start time of the first trigger frame, and the second frame includes information used for indicating the STA the first trigger frame is deleted.

Optionally, in an embodiment, the sending module 1720 is further configured to transmit uplink data to the AP; and the receiving module 1710 is further configured to receive a third frame sent by the AP, where the third frame includes information used for instructing the STA to retransmit the uplink data at a first moment, and the third frame is a control frame.

Optionally, in an embodiment, the receiving module 1710 is further configured to:

receive a second trigger frame sent by the AP, where the second trigger frame is a trigger frame with an earliest start time in a trigger frame group, the trigger frame group is used for contention access, and the second trigger frame includes information about a service type to which the trigger frame group is applicable, and information about a time resource and/or frequency resource allowed to be contended for by the applicable service type; and the sending module 1720 is further configured to perform contention access based on the information included in the second trigger frame and transmit the uplink data.

Figure 18:
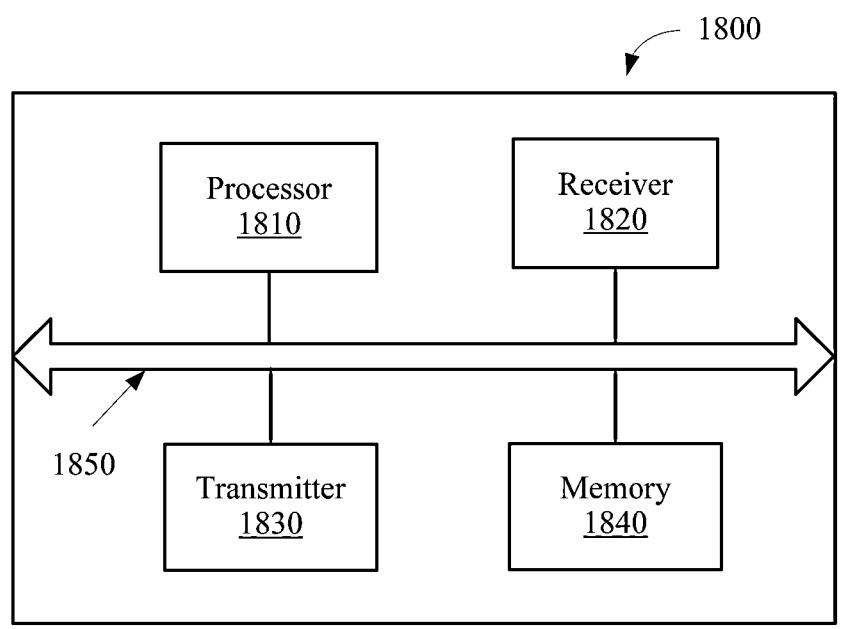
FIG. 18 is a schematic block diagram of a STA according to another embodiment of this application.

It should be noted that in this embodiment of this application, the receiving module 1710 may be implemented by a receiver, and the sending module 1720 may be implemented by a transmitter. As shown in FIG. 18, a STA 1800 may include a processor 1810, a receiver 1820, a transmitter 1830, and a memory 1840. The memory 1840 may be configured to store code and the like executed by the processor 1810.

The components in the STA 1800 are coupled by using a bus system 1850. In addition to a data bus, the bus system 1850 further includes a power bus, a control bus, and a status signal bus.

The STA 1700 shown in FIG. 17 or the STA 1800 shown in FIG. 18 can implement the processes implemented in the embodiments of FIG. 2 to FIG. 14. To avoid repetition, details are not described herein again.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

It should be understood that first, second, third, fourth, and various serial numbers in this specification are merely for purpose of distinction for ease of description, but are not intended to limit the scope of the embodiments of this application.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing descriptions have generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

This application is described in detail with reference to the accompanying drawings and in combination with the example embodiments, but the present invention is not limited thereto. Various equivalent modifications or replacements can be made to the embodiments of this application by a person of ordinary skill in the art without departing from the spirit and essence of this application, and the modifications or replacements shall fall within the scope of this application.

The invention claimed is:

1. A scheduling method, comprising:
receiving, by a station (STA), a first frame broadcast by an access point (AP), wherein the first frame comprises reservation information of each of at least one trigger frame, a first trigger frame is any one of the at least one trigger frame, and reservation information of the first trigger frame comprises an identifier of the first trigger frame, start time of the first trigger frame, and a constraint condition of a station STA corresponding to the first trigger frame; and
transmitting, by the STA, uplink data based on the reservation information including the constraint condition of the at least one trigger frame.

2. The method according to claim 1, wherein the at least one trigger frame comprises at least one of a trigger frame used for contention access or a trigger frame used for non-contention access.

3. The method according to claim 2, wherein the constraint condition comprises at least one of user group information corresponding to the first trigger frame or service type information corresponding to the first trigger frame.

4. The method according to claim 3, wherein the first frame further comprises information used to indicate start time of a second frame.

5. The method according to claim 4, further comprising:
receiving, by the STA, the second frame sent by the AP, wherein the start time of the second frame is earlier than the start time of the first trigger frame, and the second frame comprises information used for informing the STA that the first trigger frame is deleted.

6. The method according to claim 1, wherein the reservation information of the first trigger frame further comprises:
information used to indicate whether the first trigger frame is a force-to-wake-up trigger frame or a non-force-to-wake-up trigger frame.

7. The method according to claim 1, wherein the reservation information of the first trigger frame further comprises:
information used to indicate that the first trigger frame is used for downlink transmission.

8. The method according to claim 1, wherein the reservation information of the first trigger frame further comprises:
information used to indicate an operation performed on the first trigger frame, and the operation comprises addition, modification, or deletion.

9. A station (STA), comprising:
a receiver configured to receive a first frame broadcast by an access point (AP), wherein the first frame comprises reservation information of each of at least one trigger frame, a first trigger frame is any one of the at least one trigger frame, and reservation information of the first trigger frame comprises an identifier of the first trigger frame, start time of the first trigger frame, and a constraint condition of a station STA corresponding to the first trigger frame; and
a transmitter configured to transmit uplink data based on the reservation information including the constraint condition of the at least one trigger frame.

10. The STA according to claim 9, wherein the at least one trigger frame comprises at least one of a trigger frame used for contention access or a trigger frame used for non-contention access.

11. The STA according to claim 10, wherein the constraint condition comprises at least one of user group information corresponding to the first trigger frame or service type information corresponding to the first trigger frame.

12. The STA according to claim 11, wherein the first frame further comprises information used to indicate start time of a second frame.

13. The STA according to claim 12, wherein the receiver is further configured to:
receive the second frame sent by the AP, wherein the start time of the second frame is earlier than the start time of the first trigger frame, and the second frame comprises information used for informing the STA that the first trigger frame is deleted.

14. The STA according to claim 9, wherein the reservation information of the first trigger frame further comprises:
information used to indicate whether the first trigger frame is a force-to-wake-up trigger frame or a non-force-to-wake-up trigger frame.

15. The STA according to claim 9, wherein the reservation information of the first trigger frame further comprises:
information used to indicate that the first trigger frame is used for downlink transmission.

16. The STA according to claim 9, wherein the reservation information of the first trigger frame further comprises:
information used to indicate an operation performed on the first trigger frame, and the operation comprises addition, modification, or deletion.

17. A non-transitory computer-readable storage medium having program instructions stored therein, which when executed by a processor, cause the processor to perform operations, the operations comprising:
receiving, by a station (STA), a first frame broadcast by an access point (AP), wherein the first frame comprises reservation information of each of at least one trigger frame, a first trigger frame is any one of the at least one trigger frame, and reservation information of the first trigger frame comprises an identifier of the first trigger frame, start time of the first trigger frame, and a constraint condition of a station STA corresponding to the first trigger frame; and
transmitting, by the STA, uplink data based on the reservation information including the constraint condition of the at least one trigger frame.

18. The non-transitory computer-readable storage medium according to claim 17, wherein the at least one trigger frame comprises at least one of a trigger frame used for contention access or a trigger frame used for non-contention access.

19. The non-transitory computer-readable storage medium according to claim 18, wherein the constraint condition comprises at least one of user group information corresponding to the first trigger frame or service type information corresponding to the first trigger frame.

20. The non-transitory computer-readable storage medium according to claim 19, wherein the first frame further comprises information used to indicate start time of a second frame.

* * * * *